United States Patent [19]

Kreitenberg

[11] 4,380,439
[45] Apr. 19, 1983

[54] NECK VENOUS AND ARTERIAL EXAMINATION TEACHING INSTRUMENT

[76] Inventor: Arthur Kreitenberg, 5860 Cozzens St., San Diego, Calif. 92122

[21] Appl. No.: 299,840

[22] Filed: Sep. 8, 1981

[51] Int. Cl.³ .................................................. G09B 23/32
[52] U.S. Cl. ............................................................. 434/268
[58] Field of Search ............... 434/262, 265, 266, 267, 434/268, 270, 271, 272

[56] References Cited

U.S. PATENT DOCUMENTS

| | | | |
|---|---|---|---|
| 2,451,200 | 10/1948 | Church | 434/265 |
| 2,871,579 | 2/1959 | Niiranen | 434/268 |
| 3,055,356 | 9/1962 | Chovinard | 434/266 X |
| 3,662,076 | 5/1972 | Gordon | 434/267 X |
| 4,182,054 | 1/1980 | Wise | 434/272 X |

*Primary Examiner*—Harland S. Skogquist
*Attorney, Agent, or Firm*—Brown & Martin

[57] ABSTRACT

A simplified teaching instrument for diagnostic training in conditions of the human heart that employs only the senses of the practitioner to observe and palpate physical movement in simulated veins and arteries. Interchangeable cams with undulating surfaces represent the pulsation wave forms of the jugular vein and carotid artery known to result from normal and abnormal heart behavior during heart beat cycles. The cams are rotated by a variable speed motor to provide simulation of different heart beat rates. The undulating surface of the arterial cam bears directly against a resilient membrane causing it to flex and provide tactile manifestation of arterial pulses. The cam surface of the venous cam, through a follower, causes expansion and contraction of a liquid filled tube for visual simulation of jugular vein pulses. The instrument is also provided with indicator lights to represent heart sounds and murmurs associated with the heart conditions being demonstrated.

6 Claims, 7 Drawing Figures

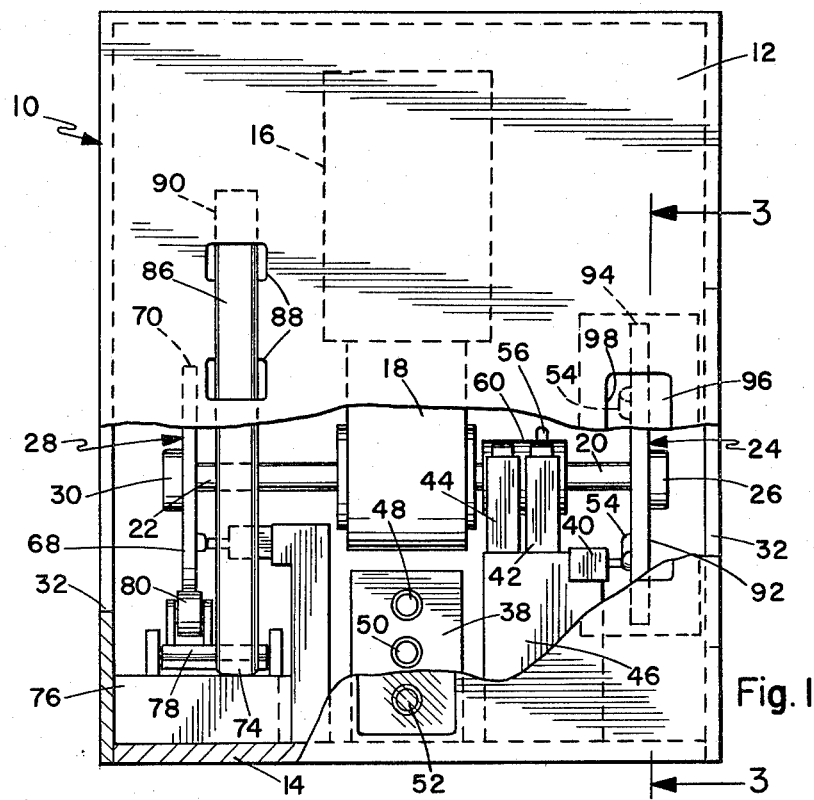
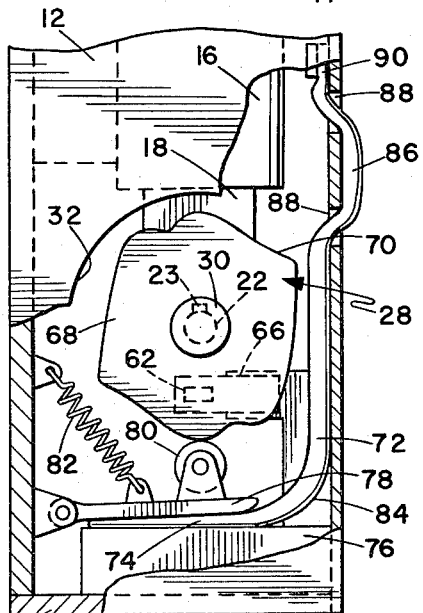
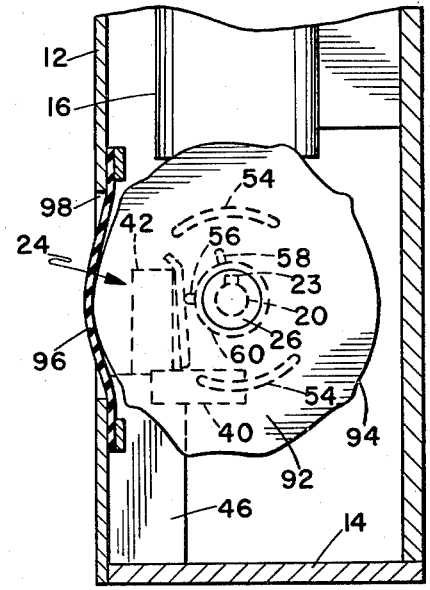

NECK VENOUS AND ARTERIAL EXAMINATION TEACHING INSTRUMENT

BACKGROUND OF THE INVENTION

As part of a physical examination, a great deal of information concerning the patient's heart may be ascertained from studying the blood vessels of the human neck. Since these vessels provide close surface exposures of the vascular system, they can best reflect the dynamics of the heart without instrumentation. The importance and value of properly identifying and interpreting pulsations of the neck veins and arteries as clues to the condition of the right and left sides of the heart respectively, have long been recognized.

In present day hospital intensive care units, the pressure pulsations of the blood vessels of patients are often measured and recorded electrically by use of transducers placed on and in the body in order to assess accurately the person's cardiovascular status. However, because of the cost, risk to the patient, or lack of availability of such sophisticated instrumentation, it is increasingly important for a physician to be able to assess, screen, and diagnose the condition of the heart at a patient's bedside using only his own eyes, ears, and hands.

Many disorders of the heart can be suspected or diagnosed from the proper interpretation of visual, audible, and palpable data obtained from such a physical examination. The variations in normal and various abnormal pulsations are subtle, however, and can be perceived only by the experienced clinician. Traditionally, this ability and experience has been derived exclusively from patient contact and examination with many years of training required. It is desirable therefore to have a self contained and simply constructed instrument to introduce and assist in such training, and which will mimic manifestations in the neck vessels of many conditions, including:

Tricricuspid Valve Regurgitation,
Tricricuspid Valve Stenosis,
Constrictive Pericarditis,
Atrial Fibrillation,
Complete Heart Block (Third Degree)
Aortic Valve Regurgitation,
Idiopathic Hypertrophic Subaortic Stenosis,
Bigeminy,
Pulsus Alternans,
Dicrotic Pulse, and
Normal Venous and Arterial Pulsations.

It is also desirable that such an instrument be portable and designed for long use without maintenance or malfunction. The teaching instrument disclosed in this application meets the above requirements.

SUMMARY OF THE INVENTION

According to the invention, a simplified analog training instrument for the diagnosis of human heart conditions has been devised which utilizes direct observation through human senses of physical fluctuations in simulated veins and arteries of the body in response to normal and abnormal heart performance.

In the exemplary embodiment of the instrument, cams rotated by a variable speed motor are employed to simulate heart operation. The periphery of the venous cams are contoured to reproduce venous pulsation wave forms known to correspond with normal and pathological conditions of the right side of the heart. The arterial cam surfaces are shaped to reproduce arterial pulsation wave forms for normal and abnormal behavior in the left side of the heart. The cam arrangement exemplified is a simple and convenient method for simulating heart behavior. The instrument is provided with sets of interchangeable venous and arterial cams, each of which represents a diagnostic training situation. The cams can be quickly and easily changed on their drive shafts to alter the physical finding to be demonstrated by the instrument.

For arterial pulse analysis, the undulating cam surface bears directly against a resilient membrane causing it to move in conformity with the simulated waveform and allowing the trainee to feel the characteristic pulsations being demonstrated by touching the membrane. For vein analysis, cam undulations cause compression in a closed flexible tube filled with fluid. The expansion and contraction of the vein represented by the tube can be visually observed by the trainee as though viewing the neck of a patient. Although venous pulsations could be simulated in other ways, this design provides for an economical, yet effective and realistic presentation. Use of the tube in the training instrument permits a realistic orientation of the simulated vein of the neck, and a portion of the pulsating tube can be made readily available at the surface of the insrument to facilitate direct or oblique observation of the simulated vein.

It is therefore an object of the invention to provide a new and improved teaching instrument for instructing individuals in the diagnosis of heart disorders utilizing only their own senses of sight, hearing, and touch. The instrument can simulate normal heart behavior and a wide range of heart disorders. It is of simple design and construction, and is self contained and portable. The teaching instrument is easily operated, and capable of long service with minimal maintenance.

Other objects and many attendant advantages of the invention will become more apparent upon reading of the following detailed description together with the drawings, in which like reference numerals refer to like parts throughout, and in which:

FIG. 1 is a front view of the teaching instrument with portions cut away.

FIG. 2 is a side elevation view as taken from the left side of FIG. 1, with portions cut away to show the venous pulse simulating mechanism of the instrument.

FIG. 3 is a cross sectional view along line 3—3 of FIG. 1 showing the arterial pulse simulating mechanism.

DETAILED DESCRIPTION OF THE DRAWINGS

Figure 5A:
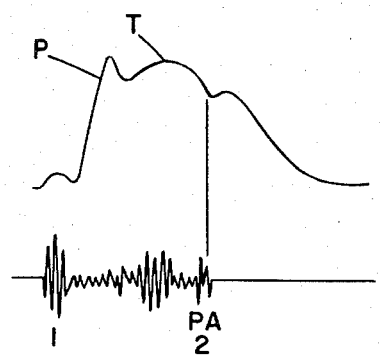
FIGS. 5a and 5b show the inside face of a typical cam configuration for the production of arterial pulses in the instrument and illustrates an idiopathic hypertrophic subaortic stenosis wave form.

The configuration and arrangement of the components making up the teaching instrument 10 are illustrated in FIG. 1. A cover 12 is mounted to a base member 14 at its lower end. In the illustrated embodiment, cover 12 is made from transparent plastic. Within the cover 12 is mounted the variable speed electric drive motor 16 together with an associated gear box 18 mounted below motor 16. Arterial drive shaft 20 and venous drive shaft 22 project horizontally from the gear box 18 and are turned in unison by drive motor 16 through the gear box. An arterial pulse cam assembly 24 is attached to the end of the drive shaft 20 by the speed nut 26. A venous pulse wave cam assembly 28 is similarly connected to drive shaft 22 utilizing the speed nut 30. The cam assemblies are oriented and kept from slipping upon their respective drive shafts by shaft keys 23 and cam keyways 25 (FIGS. 2, 3, 4 and 5). The mounting arrangement of the cam assemblies 24 and 28 in conjunction with the openings 32 on either side of cover 12 adjacent to the cams permits ready change of the cam assemblies to simulate different conditions of the human heart.

Indicator light panel 38 is mounted to base member 14 and connected by wiring and a suitable power supply, the latter two components not being shown, to switches 40, 42, and 44 on switch block 46. Switch 42 operates indicator light 48 to mark the occurrence of the first heart sound of a heartbeat. Switch 44 operates indicator light 50 to mark the occurrence of the second sound of the heart. Switch 40 operates indicator light 52 to display the occurrence of abnormal sounds of the heart such as murmurs, associated with the heart conditions represented by installed cam assemblies 24 and 28. As illustrated in FIG. 3, switches 42 and 44 are opened and closed by corresponding cam surfaces 56 and 58 that are positioned on a cylindrical cam surface 60 which is permanently attached to the drive shaft 20 to indicate the first and second heart sounds accompanying the simulated heart performance. Switch 40 is activated by cam surfaces 54 that are formed as raised sectors on the interior face of certain arterial wave form cams 92. Only the arterial cam assemblies 24, which represent abnormalities accompanied by sounds such as murmurs, require the cam surfaces 54; examples of which are aortic valve stenosis and idiopathic hypertrophic subaortic stenosis (FIGS. 1 and 5b). As illustrated in FIGS. 1 and 2, sector cam surface 62 located on the inner face of the venous waveform cam 68 activates switch 66 to turn on indicator light 52 at appropriate times for those venous cam assemblies 28 which represent abnormalities accompanied by abnormal heart sounds, such as tricuspid valve regurgitation. The venous pulse simulation mechanism of the teaching instrument 10 is illustrated in FIG. 2. The venous waveform cam 68 is rotated by motor 16. The peripheral surface 70 of cam 68 is contoured to produce the pulses of the internal jugular vein associated with a normal or diseased heart depending upon the cam selected. Vein tube 72 is filled with a viscous fluid and has a portion of its length 74 mounted below cam 68 on press plate 76 which in turn is attached to base member 14 of instrument 10. A cam follower arrangement is made up of press bar 78 hingedly mounted at one end to cover 12, and having a cam roller 80 mounted adjacent to its opposite end. Cam roller 80 is held against the contoured surface 70 of cam 68 by spring 82. Press bar 78 bears against section 74 of vein tube 72 with the result that rotation of cam 68 causes movement of bar 78 against section 74 creating pulsations in tube 72 corresponding to the contours of cam 68. Vein tube 72 is led from pressure plate 76 up the adjacent interior surface of cover 12 by inserting a 90 degree bend 84 in the tube. A portion 86 of vein tube 72 is positioned on the exterior of cover 12 by passing through openings 88 therein before being secured at point 90 on the inside of cover 12. The exposed portion 86 of the tube 72 permits ready viewing of the pulsations of the tube by a trainee either directly or tangentially.

The arterial pulsation simulation mechanism of the teaching instrument 10 is illustrated in FIG. 3. Arterial cam assembly 24 rotates on drive shaft 20. Cam assembly 24 contains an arterial waveform cam 92, the peripheral surface 94 of which is contoured to simulate either normal or pathological conditions of the left side of the heart depending upon the cam installed. The contoured cam surface 94 bears directly against a resilient membrane 96 mounted in opening 98 of the cover 12. Membrane 96 therefore flexes in response to the peripheral contour of the cam surface 94. The simulated pulses of the artery can be felt by the trainee by simply touching the exterior surface of membrane 96.

Figure 4A:
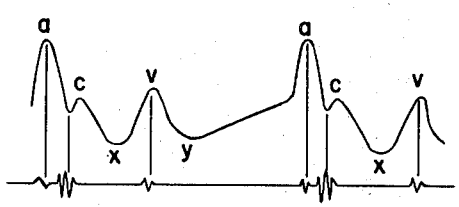
FIGS. 4a and 4b show a typical cam configuration for the production of venous pulses in the instrument and illustrates a giant "a" wave pulse wave form, as seen in tricuspid stenosis.
Figure 4B:
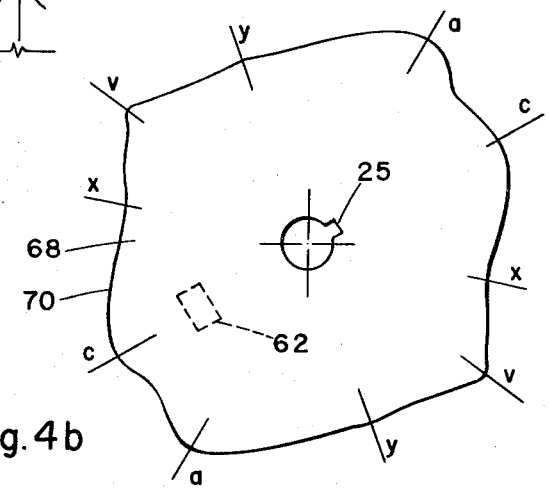

Typical venous and arterial pulse wave forms demonstrating normal and pathological behavior of the human heart are obtained and recorded by electrical instruments using well recognized and accepted procedures. A jugular venous, and corresponding heart sound tracing produced by conditions associated with increased resistance to the emptying of the right atrium, such as tricuspid stenosis, is illustrated in FIG. 4a. The venous cam contour used in the teaching instrument 10 to represent such a waveform is illustrated in FIG. 4b. The cam contour 70 representing the venous waveform for the condition will actuate press bar 78 to cause pulsations in tube 72 in conformity with the waveform of FIG. 4a.

Figure 5B:
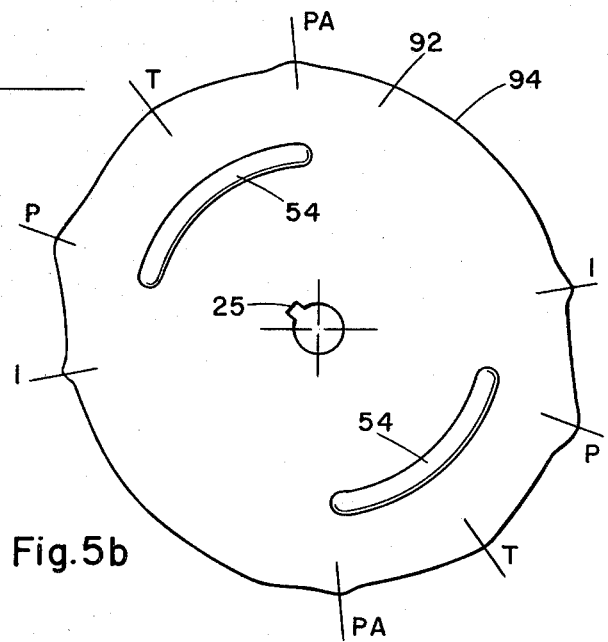

A carotid artery and heart sound tracing for a bisferiens, produced by idiopathic hypertrophic subaortic stenosis is illustrated in FIG. 5a. The corresponding two cycle cam contour used in the teaching instrument 10 to simulate this condition is illustrated in FIG 5b. The first systolic wave, referred as the percussion or P-wave, has a rapid and uninterrupted ascending limb. The peak of the P-wave is followed by a negative dip. This is in turn followed by a second systolic wave known as the tidal or T-wave. The cam surface 94 is contoured as illustrated in FIG. 5b to cause membrane 96 to move simulating the pulses P and T of the waveform. The first and second heart sounds indicated by 1 and 2 in FIG. 5a are represented on arterial cam assembly 24 by cam surfaces 54 and 56 respectively, and will cause indicator lights 48 and 50 to light at appropriate times indicating these heart sounds. The murmur shown in FIG. 5a is represented on arterial cam 92 by sector cams 54 which will cause indicator light 52 to light at the appropriate times.

OPERATION

The teaching instrument 10 is portable and easily transported for use at a desk or table. It is only necessary to have a convenient electrical power outlet. Once in position, the desired conditions of the heart to be demonstrated are selected, and the appropriate cam assemblies 24 and 28 are then installed on the arterial shaft 20 and the venous shaft 22 of gear assembly 18. Various combinations of activity for the right or left side of the heart may be selected. With the cams installed, arterial pulsations indicative of the activity of the left side of the heart are reflected in the movement of membrane 96. The trainee merely places his fingers against the exterior of membrane 96 to feel these pulses and watches the indicator lights on panel 38 in order to synchronize the heart sound with the pulsations, and note heart murmurs. For training in the proper identification and interpretation of venous pulsations indicative of the condition of the heart, the student simultaneously observes the venous pulsations and heart sound indicator lights while palpating the arterial membrane. The peripheral vision of the student may be utilized to integrate any murmur indications displayed.

Having described my invention, I now claim:

1. A neck venous and arterial examination teaching instrument comprising:
   a base member,
   a cover attachable to the base member and having a first surface and an adjacent second surface,
   sensing means mountable in the cover for producing human sensible fluctuations in simulated blood circulatory systems in response to at least one heart beat cycle,
   interchangeable cam means having undulating contours simulating normal and abnormal heart pulse wave forms for activating the sensing means,
   motor means for operating the cam means, and
   wherein the motor means and cam means are mountable on the base and enclosed within the cover to produce a self-contained hand portable instrument.

2. A neck venous and arterial examination teaching instrument as recited in claim 1, wherein the sensing means further comprises:
   tube means mountable in the first surface of the cover for visually displaying venous pulsations,
   membrane means for palpation of arterial pulses mountable in the second surface of the cover,
   indicator means mountable on the first surface of the cover and spaced between the tube means and the membrane means to represent heart sounds,
   the tube means, membrane means and indicator means being mountable on the cover and space to permit their simultaneous sensing by a trainee.

3. A neck venous and arterial examination teaching instrument as recited in claim 2, wherein the tube means comprises:
   a section of flexible tube, sealed at both ends, and containing a viscous fluid;
   a portion of the flexible tube being mountable exterior to the cover,
   cam follower means in operative relationship with the tube and cam means for squeezing the tube in response to the undulations of the cam means.

4. A neck venous and arterial examination teaching instrument as recited in claim 3, wherein the membrane means comprises:
   a resilient panel in the cover in direct operative relationship with the undulations in the arterial cams for tactile sensing.

5. A neck venous and arterial examination teaching instrument as recited in claim 2, wherein the cam means comprises:
   a plurality of venous examination cams having peripheral undulations corresponding to the pulse wave forms and corresponding heart sounds characteristic of jugular vein response to normal and abnormal heart behavior,
   a plurality of arterial examination cams having peripheral undulations corresponding to pulse wave forms and corresponding heart sounds characteristic of carotid artery pulsations in response to normal and abnormal heart behavior, and
   wherein the venous and arterial cams simulate at least one complete heartbeat cycle in a single revolution.

6. A neck venous and arterial examination teaching instrument as recited in claim 5, wherein:
   the venous and arterial cams are rotatable together by the motor means to present jugular vein and carotid artery simulations simultaneously, and
   the motor means has a selectable rotational velocity for representing varying heart beat rates.

* * * * *